UNITED STATES PATENT OFFICE.

HARRY S. MORK, OF BROOKLINE, MASSACHUSETTS, ASSIGNOR, BY MESNE ASSIGNMENTS, TO AMERICAN LA FRANCE FIRE ENGINE COMPANY, INC., OF ELMIRA, NEW YORK, A CORPORATION OF NEW YORK.

FIRE-EXTINGUISHER COMPOSITION.

1,393,236. Specification of Letters Patent. Patented Oct. 11, 1921.

No Drawing. Application filed January 14, 1918. Serial No. 211,835.

*To all whom it may concern:*

Be it known that I, HARRY S. MORK, a citizen of the United States, residing at Brookline, county of Norfolk, State of Massachusetts, have invented a certain new and useful Fire-Extinguisher Composition, of which the following is a specification.

My invention relates to fire extinguisher charges and more particularly to the carbonate solution from which carbon dioxid for expelling the extinguishing medium is generated by reaction with a suitable acid. Alkali metal salts of carbonic acid, either in the form of bicarbonate or in the form of the normal carbonate have been commonly employed for such solutions, while sulfuric acid or hydrochloric acid has usually been employed as the acid charge. In order that the carbonate solution may always remain in a condition suitable for use even when exposed to low temperatures, it has been proposed to incorporate in the carbonate solution, an ingredient for lowering the freezing point thereof. Most of those ingredients which have been heretofore proposed for this purpose are subject to one disadvantage or another. In some instances, the addition agent is not sufficiently stable, or it tends to give rise to the formation of a precipitate of insoluble carbonate or other salt or to retard the generation or evolution of the carbon dioxid gas; or its effect in small quantities has not been sufficiently marked in depressing the freezing point.

The object of my invention is to produce a carbonate solution charge of the desired low freezing point which shall be free from the disadvantages above noted. At the same time, the invention seeks to avoid the use of ingredients which might involve undue expense, or which would in any way interfere with the fire extinguishing qualities of the medium which is to be ejected from the apparatus.

According to the present invention, the carbonate solution embodying the ingredients for depressing the freezing point, exhibits all the good qualities required in a medium of this kind and in addition to having the desired low freezing point, the solution also has a somewhat increased capacity for generating carbon dioxid due to the presence of the ingredient for lowering the freezing point.

The carbonate solution embraced by my present invention comprises as essential ingredients, an alkali metal carbonate and an alkali metal acetate. The potassium carbonate and potassium acetate are specifically described and claimed in my prior application filed April 11th, 1917, Serial No. 161,295, entitled "Fire extinguisher charges," but I claim broadly in the present application the potassium salts of carbonic acid with the alkali metal acetate or alkali metal salts of carbonic acid with sodium acetate.

In order that those skilled in this art may be able to practise the invention, I shall describe several specific examples of solutions embodying the invention.

Considering first the solution as made up of sodium bicarbonate and sodium acetate crystals dissolved in water, one may proceed under the invention as follows:

5.53 grams of sodium bicarbonate and 76 grams of sodium acetate crystals are dissolved in 100 cubic centimeters of water. This produces a solution which is quite fluid at ordinary temperatures and has a freezing point of approximately —58° F. The solution becomes somewhat pasty at —32° F. 15 cubic centimeters of this solution at 20° C. when treated with 1 c.c. of sulfuric acid of sufficient strength to neutralize two-thirds of the bicarbonate showed a total gas evolution of about 55½ cubic centimeters at the end of the first minute, 65 cubic centimeters at the end of the second minute, 71 cubic centimeters at the end of the third minute, 75 cubic centimeters at the end of the fourth minute, and 77½ cubic centimeters at the end of the fifth minute. It will be observed on comparing this result with the total gas evolution from a similar quantity of a solution made up of 5.53 grams of sodium bicarbonate in 100 cubic centimeters of water, that the gas evolution from the solution containing the sodium acetate is more complete at the end of the test period than in the case of the solution not embodying the sodium acetate. The sodium bicarbonate and water solution gives from the same test quantity when treated with the same quantity of sulfuric acid at the same temperature, a total gas evolution of about 69 cubic centimeters at the end of the first minute, 71½ cubic centimeters at the end of the second minute, 72 cubic centimeters at the end of the third minute, 72½ cubic centimeters at the end of the fourth minute, and no further increase up to the end of the fifth minute.

A further example of my invention may be represented by a solution of potassium carbonate and sodium acetate in water. A solution made up 4.54 grams of potassium carbonate and 81 grams of sodium acetate crystals in 100 cubic centimeters of water, shows a freezing point of close to —40° F. While this solution exhibits the low freezing point stated, it is to be noted that crystals begin to separate when the temperature becomes as low as about —15° F. The evolution of carbon dioxid gas from this solution is somewhat better than that observed in the case of the simple solution of potassium carbonate in water. For example, 15 cubic centimeters of a test solution made up of 4.54 grams of potassium carbonate and 81 grams of sodium acetate crystals in 100 cubic centimeters of water at 20° C. showed under treatment with 1 c. c. of sulfuric acid of sufficient strength to neutralize two-thirds of the carbonate, a total gas evolution of about 32½ cubic centimeters at the end of the first minute, 33½ cubic centimeters at the end of the second minute, 34½ cubic centimeters at the end of the third minute, 35½ cubic centimeters at the end of the fourth minute, and 36½ cubic centimeters at the end of the fifth minute. The same test quantity of a solution made up of 4.54 grams of potassium carbonate in 100 cubic centimeters of water, showed under similar test a total gas evolution of about 32½ cubic centimeters at the end of the first minute, 33½ cubic centimeters at the end of the second minute, 34½ cubic centimeters at the end of the third minute, 35 cubic centimeters at the end of the fourth minute, and no further increase up to the end of the fifth minute.

Other useful solutions for the purpose of the present invention may be made up for example in about the following proportions of alkali metal salt of carbonic acid and alkali metal acetate, for each 100 c c. of water, namely: 6.60 grams of potassium bicarbonate with 53.5 grams of sodium acetate or 53.5 grams of potassium acetate; and 5.21 grams of ammonium bicarbonate with 53.6 grams of sodium acetate or 53.8 grams of potassium acetate. Good results can still be retained with considerable variation in the proportions given.

Any of the solutions embodied by my invention are well adapted to perform the functions required of a fire extinguishing medium. They are in practice employed for example as a charge in any approved type of fire extinguisher, in which an acid charge is maintained and may be introduced into the carbonate solution for developing the pressure gas of carbon dioxid employed for expelling the medium upon the fire.

I claim:

1. A carbonate solution for fire extinguishers, comprising as essential ingredients normal potassium carbonate, and sodium acetate.

2. A carbonate solution for fire extinguishers, comprising as essential ingredients normal potassium carbonate and sodium acetate, substantially in the proportions of 4.54 grams of potassium carbonate and 81 grams of sodium acetate, in 100 cubic centimeters of water.

HARRY S. MORK.